United States Patent [19]

Hamada

[11] 4,072,220

[45] Feb. 7, 1978

[54] APPARATUS FOR CONTROLLING ACTUATING FLUID PRESSURE ON VEHICULAR FRICTION CLUTCH WITH COMPENSATION FOR DECREASE IN FRICTION COEFFICIENT AT ELEVATED TEMPERATURE

[75] Inventor: Hideo Hamada, Yokosuka, Japan

[73] Assignee: Nissan Motor Company, Limited, Japan

[21] Appl. No.: 699,174

[22] Filed: June 23, 1976

[30] Foreign Application Priority Data

June 25, 1975 Japan .................................. 50-79583

[51] Int. Cl.$^2$ .............................................. B60K 21/00
[52] U.S. Cl. .................................. 192/.075; 192/.076; 192/3.58; 192/3.59; 192/82 T; 337/320
[58] Field of Search ................. 192/.07, .075, .076, 192/91 R, 3.58, 82 T

[56] References Cited

U.S. PATENT DOCUMENTS

| | | | |
|---|---|---|---|
| 3,177,993 | 4/1965 | Riehl .................................. | 192/82 T |
| 3,536,176 | 10/1970 | Cappa .................................. | 192/.076 |
| 3,684,071 | 8/1972 | Wheymann ........................ | 192/3.58 |
| 3,709,340 | 1/1973 | Murakami et al. ............ | 192/91 R X |

Primary Examiner—Benjamin W. Wyche
Attorney, Agent, or Firm—Robert E. Burns; Emmanuel J. Lobato; Bruce L. Adams

[57] ABSTRACT

A control apparatus provided with an electromagnetic valve assembly to selectively change the variation rate of a fluid pressure to actuate the clutch in dependence on the degree of opening of the throttle valve for the vehicular engine, a pulse-generating logic circuit governs the operational sequence of the electromagnetic valves, and a temperature sensor which includes a reed relay located close to the clutch, a permanent magnet attached to the flywheel of the clutch and a heat-sensitive element capable of varying the magnetic flux density passing through the reed relay when the temperature of the clutch disc exceeds a predetermined temperature. A monostable multivibrator of the control circuit has a variable resistance r-c circuit, and the resistance is varied by a signal from the temperature sensor so that a pulse for determining the duration of a relatively high increase rate of the actuating pressure at an early stage of the clutch engagement can be prolonged to compensate for a decrease in the friction coefficient of the clutch disc at elevated temperatures.

5 Claims, 11 Drawing Figures

APPARATUS FOR CONTROLLING ACTUATING FLUID PRESSURE ON VEHICULAR FRICTION CLUTCH WITH COMPENSATION FOR DECREASE IN FRICTION COEFFICIENT AT ELEVATED TEMPERATURE

BACKGROUND OF THE INVENTION

This invention relates to a clutch of the friction type in a drive line of a motor vehicle, and more particularly to a system for automatically actuating the clutch including a control apparatus for controlling a clutch actuating fluid pressure with compensation for a decrease in the cofficient of friction of the friction surfaces caused by an increase in the clutch temperature.

With regard to a conventional clutch of the friction type in a transmission line of a motor vehicle, it has been proposed to employ an actuating system which automatically applies a controlled clutch engagement force to a pressure plate of the clutch at starting of the vehicle by means of a fluid pressure in a programmed relation to the position or opening degree of a throttle valve for the engine of the vehicle. A problem in such a clutch actuating system is the influence on smooth engagement of the clutch of an inevitable decrease in the cofficient of friction of the friction surfaces with increase in the temperature of the clutch disc. Since the rate of variation in the clutch actuating pressure is programmed on the basis of a standard clutch temperature, a satisfactorily smooth engagement of the clutch and hence a smooth starting of the vehicle cannot be realized if the clutch temperature, particularly the clutch disc temperature, is excessively high due to either an immoderate use of the clutch or use in summer.

It has been tried, therefore, to estimate a decrease in the coefficient of friction by detecting an increase in the temperature of the clutch disc and regulate the clutch actuating pressure to compensate for the decrease in the coefficient of friction. However, it is not easy to detect the temperature of a rotating clutch disc in a motor vehicle. Ordinary devices for use in detecting the temperature of a rotating article such as slip rings, thermistors and transistors are not fully suitable to the application to a vehicular clutch due to inadequacy in their various properties such as shape, durability, shock and vibration resistance and weather resistance. In fact, no practicable means for detecting the temperature of a vehicular clutch disc is available.

SUMMARY OF THE INVENTION

The present invention is concerned with a motor vehicle having a throttle valve in the fuel supply line for the vehicular engine and a clutch of the friction type, which includes a clutch input member mounted on a driving shaft, a clutch output member with friction faces connected to a driven shaft and a clutch actuating mechanism including a hydraulic cylinder to apply an actuating force to the clutch and a vacuum chamber arranged to selectively communicate with a vacuum source and the atmosphere such that the displacement of a piston of the hydraulic cylinder is governed by the magnitude of vacuum in the vacuum chamber. The invention has an object of providing a control apparatus which automatically controls the rate of variation in the magnitude of the vacuum and hence the rate of variation in the clutch actuating force in dependence on the opening degree of the throttle valve and can modulate the variation rate to compensate for a decrease in the coefficient of friction of the clutch output member resulting from a significant temperature rise.

A control apparatus according to the invention comprises the following elements: (a) a combination of a plurality of electromagnetic valves arranged to provide fluid communication of the vacuum chamber with the atmosphere selectively through a plurality of orifices respectively having different cross-sectional areas; (b) a throttle valve position sensor for sensing the opening degree of the throttle valve and producing at least one electrical signal indicating in which of a plurality of ranges is the opening degree, which ranges are defined by dividing the difference of the maximum opening from the minimum opening into a plurality of successive ranges; (c) a clutch position sensor for sensing whether the clutch output member is in contact with the clutch input member and producing an electrical signal representing the sensed condition; (b) an electrical control circuit constructed and arranged to excite one of the electromagnetic valves such that the vacuum chamber communicates with a first one of the orifices for a predetermined period of time when the clutch output member is brought into contact with the clutch input member and the opening degree of the throttle valve is in the smallest range, but otherwise with a second one of the orifices. The difference in cross-sectional area between the first and second orifices is such that the magnitude of vacuum varies at so different rates as to cause the clutch actuating force to increase at a higher rate when the vacuum chamber communicates with the first orifice. The control apparatus further comprises (e) a temperature sensor for sensing whether the temperature of the clutch output member is above a predetermined temperature and producing an electrical signal representing the sensed temperature range, which temperature sensor has a reed relay attached to a stationary member located close to the clutch input member, a permanent magnet attached to the clutch input member and a heat-sensitive material arranged to vary a magnetic flux density through the reed relay such that the reed relay is closed at least once per revolution of the clutch input member when the temperature of the clutch output member exceeds the predetermined temperature. The temperature sensor is connected to the control circuit to supply an electrical signal representing the state of the reed relay, and the control circuit has an r-c circuit arranged to prolong the aforementioned predetermined period of time by a predetermined length after the reed relay is closed.

As a preferred embodiment, the temperature sensor has a housing disposed in a recess formed in the clutch input member, a flexible diaphragm arranged to divide the interior of the housing into two sections which are respectively relatively closer to and more remote from the clutch output member in the recess, a wax which is filled in one of the two sections closer to the clutch output member and has such a coefficient of volumetric expansion by heat that the diaphragm is deflexed towards the other section when the clutch output member is in contact with the clutch input member and has a temperature above the predetermined temperature, a piston slidably received in the other section of the interior of the housing such that the piston is moved towards the reed relay when the diaphragm is deflexed by the expansion of the wax. The permanent magnet is fixed to an end of the piston to approach the reed relay when the diaphragm is deflexed.

As another preferred embodiment, the temperature sensor has a paramagnetic material disposed in a recess formed in the clutch input member to cover the walls of the recess, a block of a ferromagnetic material which has a magnetic Curie point substantially equal to the predetermined temperature and is disposed in the recess to be spaced from the clutch input member by the paramagnetic material and have an exposed surface facing the reed relay. The permanent magnet is placed on the exposed surface of the ferromagnetic material block, so that the magnetic flux density through the reed relay intensifies when the temperature of the ferromagnetic material is above its Curie point.

Preferably, the control circuit includes a monostable multivibrator which produces a pulse for exciting one of the electromagnetic valves and is provided with an r-c circuit having two resistors in parallel connection, a flip-flop circuit arranged to render a transistor governing the connection between the two resistors nonconductive when the reed relay is closed and a NAND gate arranged to trigger the monostable multivibrator in response to a signal indicating that the opening degree of the throttle valve is in the smallest range.

BRIEF DESCRIPTION OF THE DRAWINGS

Other features and advantages of the invention will become apparent from the following detailed description of preferred embodiments with reference to the accompanying drawings, wherein.

DESCRIPTION OF THE PREFERRED EMBODIMENTS

Figure 1:
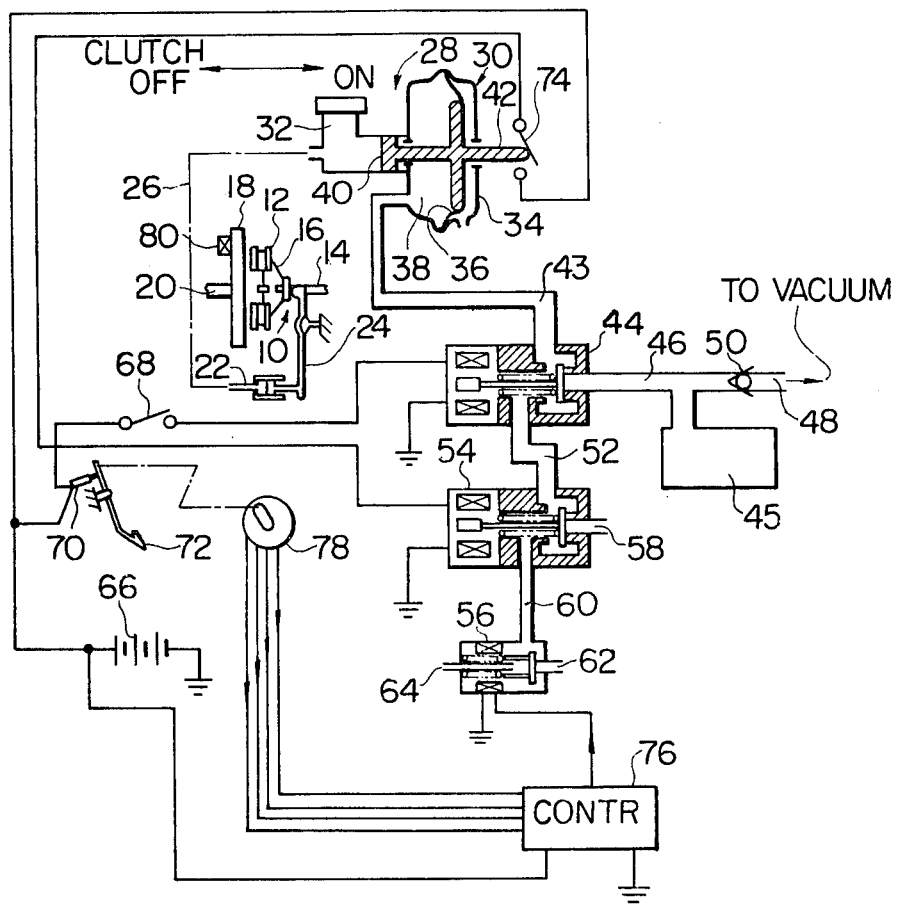
FIG. 1 is a diagram showing a general construction of a clutch system including a control apparatus according to the invention.

FIG. 1 shows a general construction of a clutch system including an exemplary automatic clutch operating mechanism and a control apparatus according to the invention. A conventional friction clutch 10 includes a clutch disc 12 connected to a driven shaft 14 with the support of a pressure plate 16, a flywheel 18 mounted on a driving shaft 20 to face the clutch disc 12 and a hydraulic cylinder 22 which applies force to the pressure plate 16 through a lever 24. A controlled fluid pressure is applied to the cylinder 22 through line 26 from a fluid servomotor 28 which consists of a vacuum-operated actuator 30 and a master hydraulic cylinder 32. The actuator 30 has a flexible diaphragm 36 installed in a housing 34 to serve as a wall of a vacuum chamber 38 occupying a portion of the interior of the housing 34. One side of the diaphragm 36 is exposed to the atmosphere. A piston 40 of the master cylinder 32 extends into the vacuum chamber 38 and is fixed to the diaphragm 36. A rod 42 extends from the diaphragm 36 in the opposite direction to the piston 40 and can be regarded as an extension of the piston 40. The clutch 10 is in the disengaged state when the fluid pressure applied to the cylinder 36 and the piston 40 are arranged such that the magnitude of the fluid pressure provided by the master cylinder 32 decreases as the magnitude of vacuum in the vacuum chamber 38 decreases.

A port 43 connects the vacuum chamber 38 to a first solenoid valve 44 which will be referred to as the disengagement solenoid valve. In an excited state or ON-state, this solenoid valve 44 allows the port 43 to communicate with a vacuum reservoir 45 through a vacuum intake port 46 of the solenoid valve 44. The vacuum reservoir 45 communicates with the intake manifold (not shown) of the vehicular engine through a passage 48 which is provided with a check valve 50. When the solenoid valve 44 is in an unexcited state or OFF-state, the port 43 is in communication with the atmosphere through an atmosphere port 52 of the solenoid valve 42. A second solenoid valve 54 which will be referred to as the engagement solenoid valve and a third solenoid valve 56 which will be referred to as the control solenoid valve are provided to control the rate of air admission into the vacuum chamber 38 through the ports 52 and 43. The engagement solenoid valve 54 has an orifice 58 exposed to the atmosphere and causes the port 52 to communicate with this orifice 58 when the clutch 10 is in the disengaged state and the engagement solenoid valve 54 is in ON-state. In OFF-state, the engagement solenoid valve 54 causes the port 52 to communicate with the control solenoid valve 56 through a port 60. The control solenoid valve 56 has two orifices both exposed to the atmosphere: a first orifice 62 having a larger cross-sectional area and a second orifice 64 of a smaller cross-sectional area. The first orifice 62 is smaller in cross-sectional area than the orifice 58 of the engagement solenoid valve 54. The port 60 communicates with the atmosphere through the first orifice 62 when the control solenoid valve 56 is in ON-state but through the second orifice 64 when the solenoid valve 56 is in OFF-state.

An electrical circuit to provide an exciting current from a D.C. power source 66 to the disengagement solenoid valve 44 includes switch 68 designated as the shift switch and another switch 70 designated as the throttle switch in series connection. The shift switch 68 is normally open but closed when a transmission shift lever (not shown) of the vehicle is manipulated. The throttle switch 70 is normally closed but opens when an accelerator pedal 72 is depressed. An electrical circuit for exciting the engagement solenoid valve 54 includes a switch 74 designated as the stroke switch, which opens only when the pressure in the vacuum chamber 38 is so close to the atmospheric pressure that the piston 40 and the extension rod 42 are brought sufficiently rightwards in FIG. 1. An exciting current is supplied to the control solenoid valve 56 from an electronic control device 76. The construction of this control device 76 will be described hereinafter in detail. A throttle sensor indicated at 78 is arranged to detect the degree of the opening of the throttle valve (not shown) for the vehicular engine and transmit the detected opening degree of the throttle valve as electrical signals to the control device 76. For example, the sensor 78 selectively produces one of four kinds of signals respectively indicating the following four ranges of the opening degree: (1) a range from 0 to ⅛ of a fully open position, (2) from ⅛ to ⅜ of the fully open state, (3) from ⅜ to 6/8, and (4) from 6/8 to 8/8 (the fully open position).

As the most important feature of the invention, a temperature sensor indicated at 80 of a unique construction is assembled with the clutch 10 to supply an electrical signal to the control device 76 when the temperature of the clutch disc 12 is above a predetermined temperature. The control device 76 produces an output primarily in response to the signals from the throttle sensor 78 but introduces such a modification of its output in response to the signal from the temperature sensor 80 that the output of the servomotor 28 may vary to compensate for a lowering in the coefficient of friction of the clutch disc 12 resulting from a temperature rise of the clutch disc 12.

Figure 2:
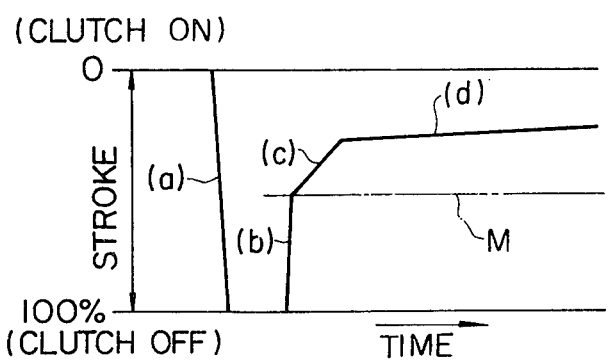
FIG. 2 is a chart showing in general the variation in the rate of clutch engagement in the system of FIG. 1.

At starting of the vehicle, the clutch operating mechanism of FIG. 1 functions briefly as follows. The shift switch 68 closes upon manipulation of the shift lever and brings about ON-state of the disengagement solenoid valve 44. As the result, the vacuum chamber 38 of the actuator 30 is evacuated and the piston 40 of the master cylinder 32 is moved leftwards in FIG. 1 to cause a rightward stroke of the plunger (not indicated) of the hydraulic cylinder 22. Accordingly the clutch 10 shifts to a fully disengaged state in a manner as represented in the chart of FIG. 2 by the curve (a). The ordinate of this chart represents the degree of the displacement of the plunger of the hydraulic cylinder 22, and the horizontal line M represents a degree of the displacement at which the clutch disc 12 is just in contact with the flywheel 18. Then the accelerator pedal 72 is depressed, causing the throttle switch 70 to open. Accordingly the disengagement solenoid valve 44 shifts to OFF-state and allows the vacuum chamber 38 to communicate with the atmosphere through the orifice 58 of the engagement solenoid valve 54. Naturally, the diaphragm 36 moves rightwards together with the piston 40 to cause the clutch 10 to approach an engaged position at a rate as represented by the curve (b) in the chart of FIG. 2. When the diaphragm 36 moves to a certain extent, the clutch disc 12 comes into contact with the flywheel 18. At the same time, the extension rod 42 comes into contact with and opens the stroke switch 74. Then the engagement solenoid valve 54 assumes an OFF-state and makes the vacuum chamber 38 communicate with the atmosphere not through the orifice 58 but through one of the first and second orifices 62 and 64 of the control solenoid valve 56.

The port 60 and hence the vacuum chamber 38 communicate with the atmosphere through the first orifice 62 only when the control solenoid valve 56 is in ON-state but otherwise through the second orifice 64. The control device 76 produces an output to transmit power to the solenoid valve 56 only when the control device 76 receives a signal from the throttle sensor 78. The output of the control device 76 is produced for a certain period of time in a programmed relation to the opening degree of the throttle valve as will be described hereinafter. The rate of displacement of the plunger of the hydraulic cylinder 22, i.e. the rate of increase in the compressing force on the clutch disc 12, is represented by the curve (c) in the chart of FIG. 2 when the control solenoid valve 56 is in ON-state to make the first orifice 62 communicate with the port 60. When the solenoid valve 56 is in OFF-state, the same rate becomes lower as represented in the curve (d).

Figure 3:
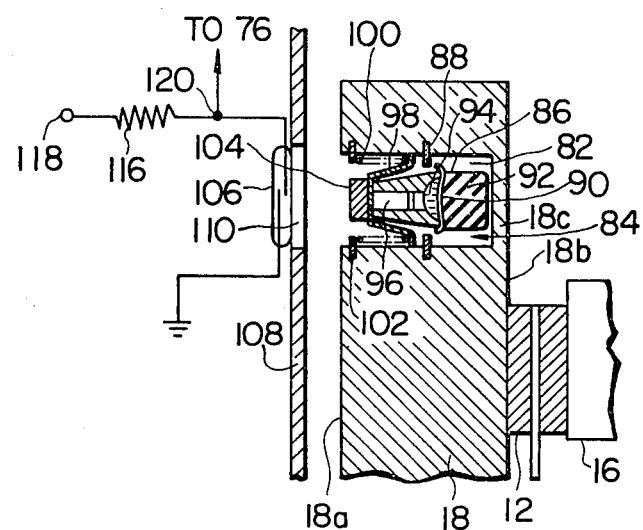
FIG. 3 is a sectional view of a temperature sensor in a control apparatus according to the invention and shows a state at room temperature.
Figure 4:
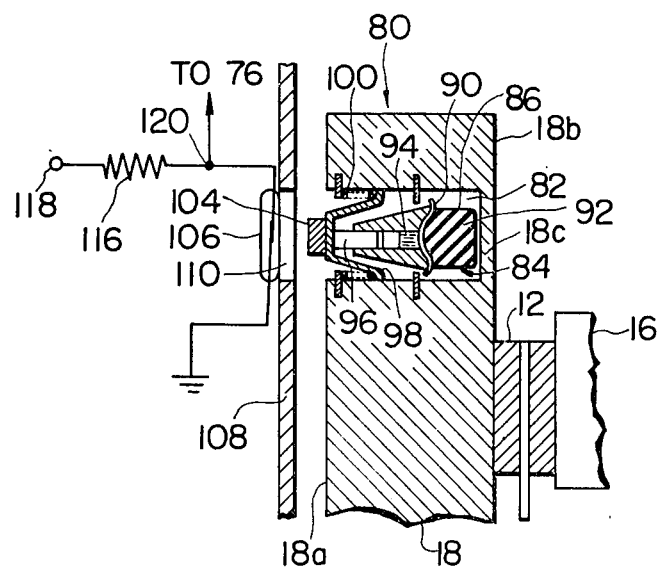
FIG. 4 is the same view but shows another state at an elevated temperature.

A preferred embodiment of the temperature sensor 80 is illustrated in FIGS. 3 and 4. The flywheel 18 of the clutch 10 has a recess 82, a cylindrical one for example, formed on its one side 18a reverse of a surface 18b subject to contact with the clutch disc 12, so that the flywheel 18 has a small thickness in a region 18c defining the bottom of the recess 82. A thermostat 84 is installled in this recess 82 to occupy a position close to the bottom. The thermostat 84 has a housing 86 secured to the flywheel 18 with a retainer 88 and a flexible diaphragm 90 installed generally parallel to the clutch disc 12 to divide the interior of the housing 86 into two sections. One of the two sections closer to the bottom of the recess 82 is filled with a wax 92 which has a large coefficient of volumetric expansion by heat. The other section is so shaped in a first region adjacent to the diaphragm 90 as to allow deflection of the diaphragm 90 by expansion of the wax 92 and has a cylindrical shape of a narrower cross section with an open end in the remaining second region. The first region is filled with a liquid 94 of a high viscosity, and a piston 96 is slidably received in the second region. The piston 96 is in contact with the liquid 94 at its inner end. A cap member 98 is fixed to the outer end of the piston 96 to extend along the outer surface of the housing 86. A compression spring 100 is installed in the recess 82 with the support of a retainer 102 to bias the cap member 98 and hence the piston 96 towards the diaphragm 90. A permanent magnet 104 is fixed to the cap member 98 on the reverse side of the piston 96. The temperature sensor 80 includes a normally open reed relay 106 which is attached to a stationary member 108 located close to the flywheel 18 such as, for example, a rear support plate of the vehicular engine to face the permanent magnet 104 through an aperture 110 formed in the stationary member 108.

The thermostate 80 remains in a state as shown by FIG. 3 while the clutch disc 12 and hence the flywheel 18 have not a high temperature. When the clutch disc 12 is in contact with the flywheel 18 and reaches such a high temperature as to bring about a noticeable decrease in the coefficient of friction, a temperature rise of the flywheel 18 causes the wax 92 of the thermostat 84 to expand so greatly as to deflect the diaphragm 90 towards the piston 96 as shown in FIG. 4. The liquid 94, therefore, is squeezed into the narrow cylindrical region of the interior of the housing 86 and pushes the piston 96 towards the stationary member 108. Naturally the permanent magnet 104 approaches the reed relay 106. When the distance between the reed relay 106 and the permanent magnet 104 decreases to a certain extent, the magnetic force of the permanent magnet 104 brings about ON-state of the the reed relay 106. Since the flywheel 18 makes a rotational movement relatively to the stationary member 108, the reed relay 106 soon resumes OFF-state even though the wax 92 remains in the expanded state. When the flywheel 18 has only one thermostat 84, the reed relay 106 is intermittently closed at the rate of once per revolution of the flywheel 18. The reed relay 106 is arranged to ground a resistor 116 when in ON-state. The reference numeral 118 indicates an input terminal of the resistor 116, and an output terminal 120 located between the resistor 116 and the reed relay 106 is connected to the control device 76. Accordingly the temperature sensor 80 can provide one pulse per revolution of the flywheel 18 when the temperature of the clutch disc 12 is above a certain temperature which can be predetermined by a suitable choice of the parameters of the thermostat 86.

Figure 5:
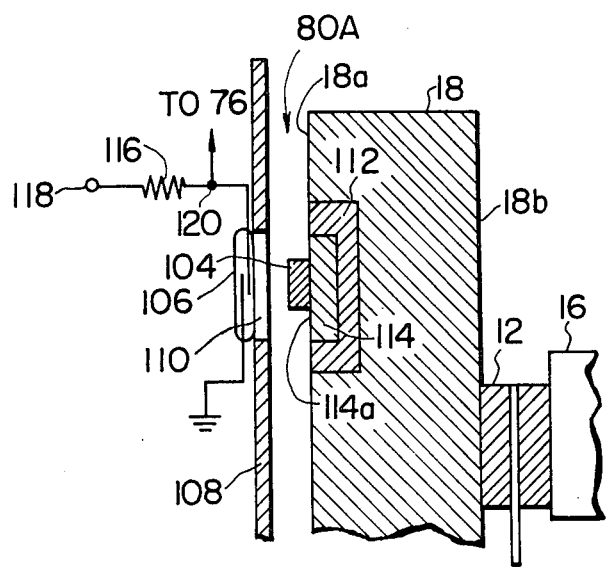
FIG. 5 is a sectional view of a differently constructed temperature sensor for the same purpose.

FIG. 5 shows a temperature sensor 80A of a different type as another preferred embodiments of the invention in this respect. The temperature sensor 80A of FIG. 5 has the reed relay 106 arranged in the same manner as in the sensor 80 of FIG. 3 in combination with the permanent magnet 104. However, the permanent magnet 104 is arranged to make no movement relatively to the flywheel 18. A recess (no numeral) is formed on the surface 18a of the flywheel 18, and a generally cup-shaped member 112 of a paramagnetic material is fixedly disposed in this recess. A block 114 of a ferromagnetic material is fixedly received in the cup-shaped member 112 such that the block 114 is partitioned from the flywheel 18 by the cup-shaped member 112 and has a surface 114a facing towards the stationary member 108. The ferromagnetic material of the block 114 is selected such that the ferromagnetic Curie temperature Tc of this material roughly agrees with an elevated temperature which is to be detected by the sensor 80. The permanent magnet 104 is attached to the exposed surface 114a of the ferromagnetic material block 114 to face the reed relay 106, for example, through the aperture 110.

Figure 6:
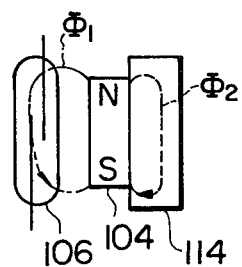
FIG. 6 is a fragmentary sketch of the temperature sensor of FIG. 5 for the explanation of the function of the sensor.
Figure 7:
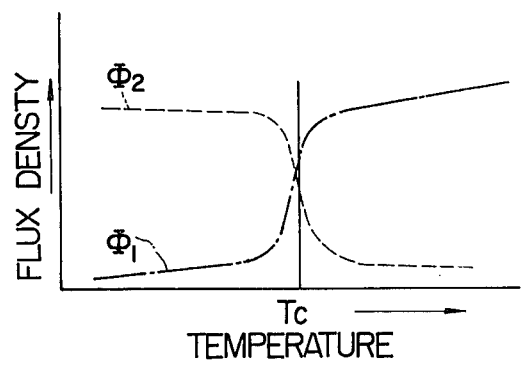
FIG. 7 is a graph illustrating the relationship between a magnetic characteristic of the sensor of FIG. 5 and the temperature of the sensor.

The function of the thus constructed temperature sensor 80A will be described with reference to FIGS. 6 and 7. A magnetic flux $\Phi_1$ which passes through the reed relay 106 due to the presence of the permanent magnet 104 is different in intensity from another magnetic flux $\Phi_2$ passing through the ferromagnetic material block 114 as explanatorily shown in the graph of FIG. 7. The flux $\Phi_2$ has a higher intensity than the other flux $\Phi_1$ so long as the ferromagnetic material block 114 is maintained at temperature below its Curie temperature Tc. However, the ferromagnetic material 114 loses its ferromagnetic property and acquires a paramagnetic property at temperature above its Curie point Tc. Accordingly the intensity of the magnetic flux $\Phi_2$ exhibits an abrupt transition to a considerably lower level when the flywheel 18 is heated to the Curie point Tc due to a temperature rise of the clutch disc 12. At the same time, the transition of the ferromagnetic material 114 to a paramagnetic material causes the magnetic flux $\Phi_1$ to gain an enhanced intensity as shown in FIG. 7. As the result, the reed relay 106 begins to intermittently acquire ON-state when the temperature of the ferromagnetic material block 114 reaches the Curie point Tc.

The reed relay 106 and/or the thermostat 86 of FIG. 3 (or the magnet assembly of FIG. 5) may of course be provided in plurality so that the pulse-form signal may be produced twice or more times per revolution of the flywheel 18. When two or more sets of the temperature sensors 80A are assembled with the flywheel 18, it is possible to obtain temperature signals at two or more temperature levels by using ferromagnetic materials of different Curie points for the blocks 114 of the respective sensors 80A in combination with the reed relays 106 of different characteristics.

An example of the control device 76 according to the invention will be described with reference to a block diagram of FIG. 8. This control device 76 is a combination of a logic circuit and a Darlington transistor indicated at 122 as a switch for governing the flow of an exiting current through the solenoid 56a of the control solenoid valve 56 in FIG. 1.

An input terminal 128 of the control device 76 receives a clutch disengagement signal which is at a high voltage level i.e. a logic "1" signal, expressed hereinafter by H level or H signal when the clutch 10 is in the disengaged state but at a low level voltage i.e. a logic "0" signal, expressed hereinafter by L level or L signal when the clutch disc 12 is in contact with the flywheel 18. The two input terminals of a first NOR gate 130 of the control device 76 are connected to the input terminal 128 and the output terminal 120 of the temperature sensor 80, respectively. A second NOR gate 132 and a third NOR gate 134 are connected to constitute a flip-flop circuit. One input terminal of the second NOR 132 is connected to the clutch disengagment signal input terminal 128 while one input terminal of the third NOR 134 to the output terminal of the first NOR 130. The output terminal of the third NOR 134 is connected to the base of a transistor 138 through a resistance 136.

First and second resistors 140 and 142, which are preferably but not necessarily variable ones, are connected in parallel with each other to interpose between a positive voltage input terminal 144 and a capacitor 146. The resistors 140 and 142, and the capacitor 146 constitute an r-c circuit, and the transistor 138 is included in this r-c circuit to selectively provide and break the connection of the second resistor 142 with the first resistor 140.

The control device 76 has four NAND gates 150, 152, 154 and 156 in combination with four monostable multivibrators 160, 162, 164 and 166. One input terminal of the first NAND 150 is connected to an input terminal 158 for receiving a signal which represents the speed of the vehicle and is at H level only when the speed is 15 km/hr, for example, or below. Four input terminals 170, 172, 174 and 176 are connected to the throttle opening sensor 78 in FIG. 1 so that H level signals may be applied to these four input terminals 170, 172, 174 and 176 when the opening degree of the throttle valve is in the aforementioned 0-⅛ range, ⅛ - ⅜ range, ⅜ - 6/8 range and 6/8 - 8/8 range, respectively. The output terminals of the four NAND gates 150, 152, 154 and 156 are connected to the input terminals of the four monostable multivibrators 160, 162, 164 and 166, respectively, so that the four monostable multivibrators 160-166 may be triggered when the outputs of the four NAND gates 150-156 shift from H level to L level, respectively. The H and L level outputs are respectively logic "1" and "0" signals. The effort of H level and L level inputs to the NAND gates 152, 154 and 156 will later herein be explained. The output terminals Q of the four monostable multivibrators 160-166 are connected to the four input terminals of an OR gate 168, respectively. Inverse output terminals Q' of the three monostable multivibrators 160, 162 and 164 are connected to the remaining input terminals of the three NAND gates 152, 154 and 156, respectively.

The capacitor 146 of the r-c circuit is connected to a pair of terminals 148 of the monostable multivibrator 160. The r-c circuit including the resistors 140 and 142 and the capacitor 146 serves as the r-c circuit inherent to the monostable multivibrator 160 though arranged externally.

The output terminals of the OR gate 168 is connected to the base of the transistor 122 through a resistance 124. The emitter of the transistor 122 is grounded and the collector is connected to the solenoid 56a which is provided with a diode 126 in parallel connection.

The control circuit of FIG. 8 functions as follows when the temperature of the clutch disc 12 and the flywheel 18 is not so high as to render the reed relay 106 of the temperature sensor 80 (or 80A) conductive. In this state, the output of the temperature sensor 80 (or 80A), which is an input signal to the first NOR gate 130, is at the same level as the input terminal 118, i.e. at H level, so that the NOR 130 provides L signal. When the clutch 10 is in the disengaged state, the second NOR receives H signal through the input terminal 128 and provides L level output. Accordingly the third NOR 134 receives two L level inputs and produces H level output. The transistor 138 is rendered conductive by the H level outout of the NOR 134, so that the resistor 142 as well as the resistor 140 serves as the resistance of the r-c circuit of the first monostable multivibrator 160. Accordingly a pulse $P_1$ produced by this monostable multivibrator 160 has a width $D_1$ determined by the following equation:

$$D_1 = \log_e \frac{2C}{\frac{1}{R_1} + \frac{1}{R_2}}$$

where C is the capacitance of the capacitor 146, and $R_1$ and $R_2$ are the resistances of the resistors 140 and 142, respectively.

Figure 9A:
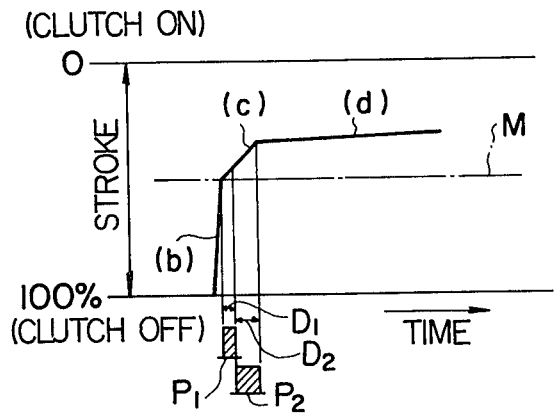
FIG. 9 presents two charts showing a variation in the clutch engagement rate caused by a control apparatus including the control circuit of FIG. 8 in response to an increase in the clutch temperature.
Figure 9B:
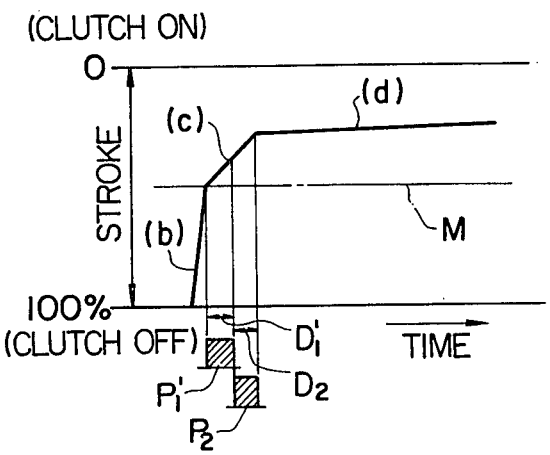

When the vehicle is at a halt, the vehicle speed signal applied to the input terminal 158 is at H level but the throttle valve position signal applied to the input terminal 170 is at L level. When the accelerator pedal 72 is so depressed as to open the throttle valve to a degree more than ⅛ of the fully opened position, the output of the first NAND gate 150 shifts from H level to L level since the input signal to the terminal 170 becomes L level. Accordingly the first monostable multivibrator 160 is triggered and produces the pulse $P_1$ of positive polarity (H level) at its output terminal Q. This pulse $P_1$ is applied to the transistor 122 through the OR gate 168, so that the transistor 122 remains conductive for a period of $D_1$ and causes the solenoid 56a to be excited. As the result, the engagement of the clutch 10 proceeds at the rate (c) in FIG. 2 while the pulse $P_1$ is applied to the transistor 122 as illustrated by the chart (A) of FIG. 9. If the opening degree of the throttel valve is in the range from ⅛ to ⅜, the second NAND 152 receives a H level input through the terminal 172. The first monostable multivibrator 160 supplies an inversed output of H level from its second output terminal Q' at the instance of the disappearance of the pulse $P_1$, so that the output of the NAND 152 shifts from H level to L level. Then the second monostable multivibrator 162 supplies a pulse $P_2$ having a width $D_2$ from its first output terminal Q to the transistor 122. The engagement of the clutch 10, therefore, continues to proceed at the rate (c) for a period of $D_2$ after the disappearance of the first pulse $P_1$. Thereafter the engagement of the clutch 10 proceeds at the rate (d) since the solenoid valve 56 remains in the OFF-state and causes the vacuum chamber 38 to communicate with the atmosphere through the narrowest orifice 64. If the accelerator pedal 72 were so depressed as to open the throttle valve to an opening degree in the range between ⅜ and 6/8, another pulse would be produced by the third monostable multivibrator 164 successively to the second pulse $P_2$, resulting in the maintenance of the clutch engagement rate (c) for an additional period of time. Also the fourth monostable multivibrator 166 produces a pulse if the opening degree of the throttle valve is in the range between 6/8 and 8/8.

The pulse $P_1$ has a constant width $D_1$ so long as the temperature signal supplied to the first NOR 130 through the terminal 120 remains at H level even though the clutch disengagement signal applied to the terminal 128 turns to L level (upon contact of the clutch disc 12 with the flywheel 18), because the outputs of the NOR gates 132 and 134 remain at L level and at H level, respectively.

The permanent magnet 104 causes the reed relay 106 to intermittently close when the temperature of the clutch disc 12 and the flywheel 18 is above a predetermined temperature as described hereinbefore. The output of the temperature sensor 80 (or 80A) as an input to the first NOR 130, therefore, becomes L level, for example, once per revolution of the flywheel 18 each time for a very short period of time. If the clutch disc 12 is in contact with the flywheel 18 under this condition, another input signal to the NOR 130 through the terminal 128 is at L level. Accordingly the NOR 130 provides a H level output which is in the form of a pulse at the rate of once per revolution of the flywheel 18. Since the second NOR 132 supplies a L signal to the third NOR 134, the output of the NOR 134 shifts from H level to L level upon receipt of the H level pulse from the first NOR 130 and renders the transistor 138 nonconductive. In this state, the time constant of the r-c circuit of the first monostable multivibrator 160 is determined only by the first resistor 140 and the capacitor 146. Consequently, the first monostable multivibrator 160 produces a pulse $P_1$, with a width $D_1$, determined by $\log_e 2CR_1$ when the output of the first NAND 150 shifts from H level to L level. The pulse width $D_1$, is apparently longer than the pulse width $D_1$ of the pulse $P_1$ which is produced when the reed relay 106 is is an OFF state. The r-c circuit retains the increased time constant even when the reed relay 106 resumes an OFF state and accordingly the first NOR 130 provides a L signal, because the second NOR 132 continues to supply a H signal to the third NOR 134 and hence the output of the NOR 134 remains at L level.

Figure 8:
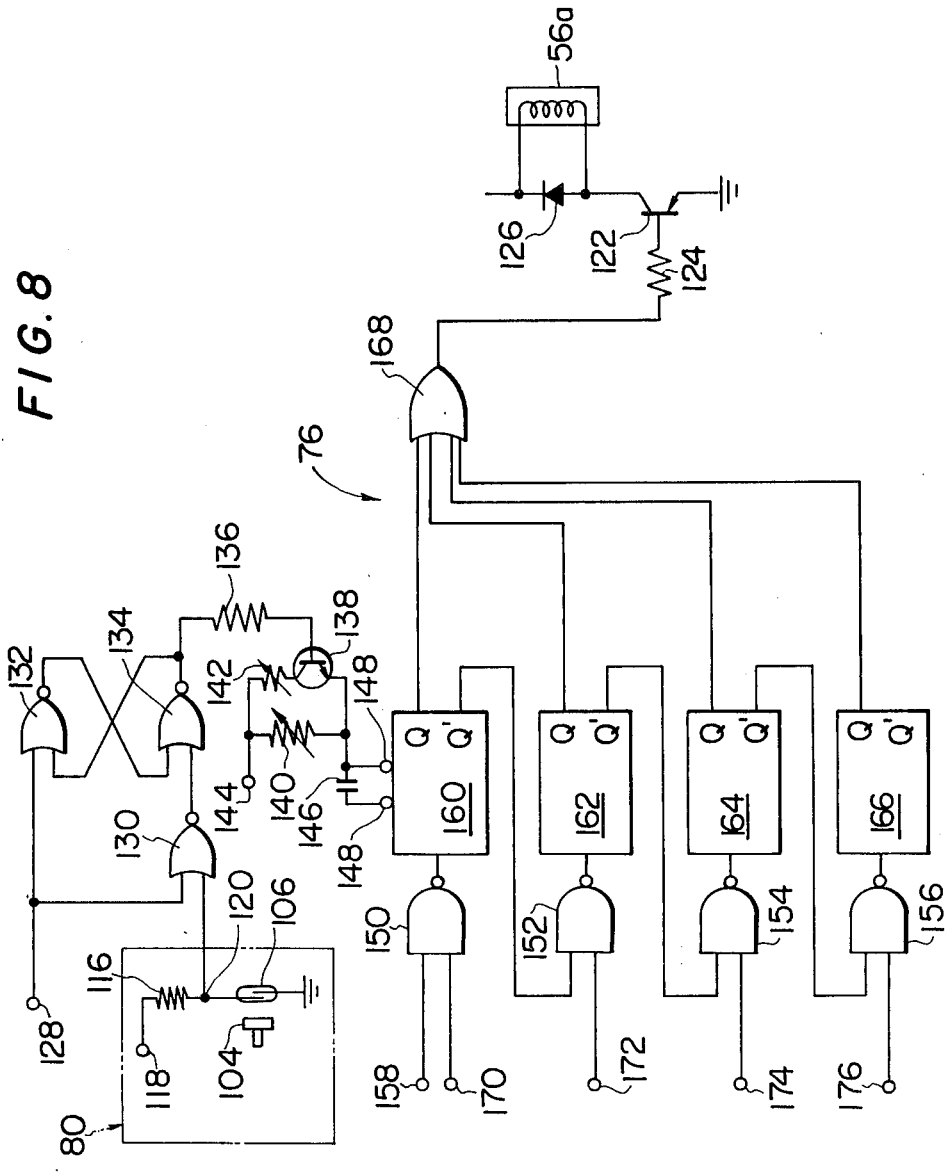
FIG. 8 is a block diagram of a temperature sensor and a control circuit in a control apparatus according to the invention.

Except for the above described increase in the pulse width with regard to the first monostable multivibrator 160, the function of the control circuit of FIG. 8 remains unchanged regardless of the temperature of the clutch 10. When the resistor 142 is made ineffective due to a temperature rise of the clutch disc 12, the engagement of the clutch 10 proceeds as illustrated by the chart (B) of FIG. 9 in comparison with the previously explained chart (A). Due to the prolonged width $D_1$, of the pulse $P_1'$, the engagement rate (c) is maintained for a longer period of time when the clutch disc 12 has a very high temperature and hence a decreased coefficient of friction. The engaging pressure at the transition of the engagement rate from (c) to (d) is higher in the case of the chart (B) than in the case of the chart (A), and the increased transition pressure is attributable to the fact that the engaging pressure is brought to a higher value while the opening degree of the throttle valve is in the range between 0 and ⅛ in the case of the chart (B).

Thus, the change in the time constant of the r-c circuit of the first monostable multivibrator 160 can effectively compensate for the decrease in the coefficient of friction of the clutch disc 12. As seen from the foregoing description, the compensation according to the invention is accomplished completely automatically, so that the vehicle can be started smoothly even though the clutch disc 12 has a very high temperature. Of course it is possible to accomplish the compensation more precisely and fluently by the use of a plurality of temperature sensors and the provision of additional resistors to the r-c circuit of the first monostable multivibrator 160. A variable time constant r-c circuit may be provided also to the second monostable multivibrator 162. A combination of the reed relay 106 and the permanent magnet 104 according to the invention does not offer any obstruction to the rotation of the clutch disc 12 and is not affected by environmental conditions such as severe mechanical vibrations and repeated heat shocks.

Figure 10:
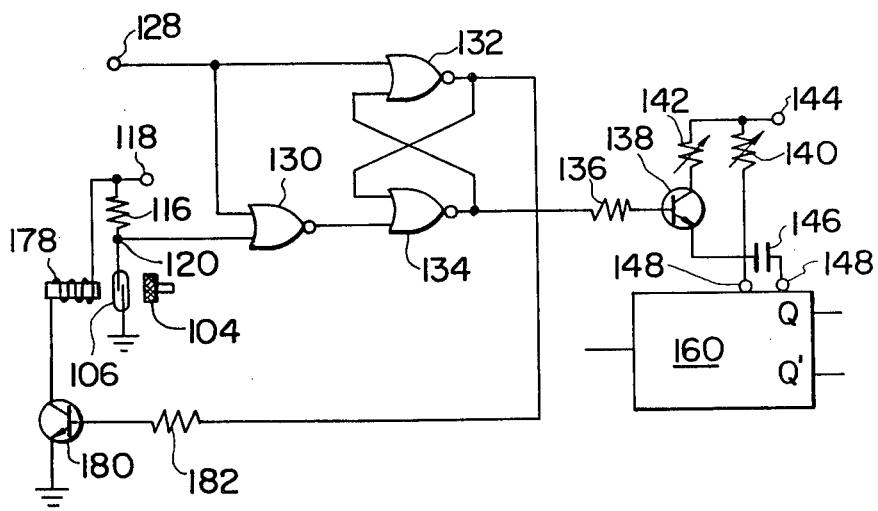
FIG. 10 is a block diagram showing partial modifications of the temperature sensor and the control circuit of FIG. 8.

The temperature sensor 80 (or 80A) and the control device 76 may partly be modified as shown in FIG. 10 for the purpose of relieving the contact points of the reed relay 106 from being operated very frequently. In FIG. 10, the temperature sensor 80 (or 80A) has an electromagnet 178 which is attached to the stationary member 108 in FIG. 3 at such positional relation to the reed relay 106 that the electromagnet 178 can provide a magnetic flux for closing the reed relay 106. The exciting circuit of the electromagnet 178 includes a transistor 180 as a switch. The base of this transistor 180 is connected to the output terminal of the second NOR gate 132 of the control circuit 76 through a resistor 182. The transistor 180, therefore, is conductive when the output signal of the second NOR 132 is at H level. Accordingly the electromagnet 178 remains in the excited state and causes the reed relay 106 to remain in ON state so long as the output of the second NOR 132 is at H level. In other respect, the construction and function of the control device 76 are in consistence with the previous description with reference to FIG. 8.

What is claimed is:

1. In a motor vehicle having an engine and a fuel supply line for supplying fuel thereto, a throttle valve in the fuel supply line for the vehicular engine, a driving shaft driven from the engine, a clutch of the friction type including a clutch input member mounted on said driving shaft and a clutch output member with friction faces, a driven shaft connected to the clutch output member and a clutch actuating mechanism including a hydraulic cylinder to apply an actuating force to the clutch, a vacuum chamber to selectively communicate with a vacuum source and the atmosphere such that the displacement of a piston of the hydraulic cylinder is governed by the magnitude of vacuum in the vacuum chamber, a control apparatus for automatically controlling the rate of variation in said magnitude of vacuum and modulating the variation rate when the clutch has a high temperature to compensate for a decrease in the coefficient of friction of the clutch output member, the control apparatus comprising:

a combination of a plurality of electromagnetic valves arranged to provide fluid communication of said vacuum chamber with the atmosphere selectively through a plurality of orifices respectively having different cross sectional areas; means defining said orifices;

means for sensing the degree of opening of the throttle valve and producing at least one electrical signal indicating and representing in which of a plurality of ranges is the degree of opening, said ranges being defined by dividing the difference of the maximum opening from the minimum opening into a plurality of successive ranges;

means for sensing whether the clutch output member is in contact with the clutch input member and producing an electrical signal representing and corresponding to the sensed condition;

an electrical control circuit to excite one of said electromagnetic valves such that said vacuum chamber communicates with a first one of said orifices for a predetermined period of time when the clutch output member is brought into contact with the clutch input member and the degree of opening of the throttle valve is in the smallest range, said vacuum chamber communicating with a second one of said orifices when said one electromagnetic valve is unexcited, a difference in cross-sectional area between said first and second orifices being such that said magnitude of said vacuum varies at different rates to cause the clutch actuating force to increase at a higher rate when said vacuum chamber communicates with said first orifice;

a temperature sensor for sensing whether the temperature of the clutch output member is above a predetermined temperature and producing an electrical signal representing and corresponding to the sensed temperature range, the temperature sensor having a reed relay, a stationary member located close to the clutch input member to which said reed relay is attached, a permanent magnet attached to the clutch input member and heat-sensitive means for varying magnetic flux density through said reed relay such that said reed relay is closed at least once per revolution of the clutch input member when the temperature of the clutch output member exceeds said predetermined temperature, means connecting said temperature sensor to said control circuit to supply an electrical signal representing the state of said reed relay, said control circuit having an r-c circuit to prolong said predetermined period of time by a predetermined length after said reed relay is closed.

2. A control apparatus as claimed in claim 1, wherein said control circuit comprises: first, second and third NOR gates, said electrical signal representing the condition of the clutch being at a high voltage (H) level and at a low voltage (L) level when the clutch output member is separate from and in contact with the clutch input member, respectively, and being supplied to both an input terminal of said first NOR gate and an input terminal of said second NOR gate, said reed relay being connected to another input terminal of said first NOR gate to supply a H level signal when remains open and a L level signal when closed, the output terminal of said first NOR gate being connected to an input terminal of said third NOR gate, means connecting said second and third NOR gates in a flip-flop circuit configuration; a first monostable multivibrator including an r-c circuit having first and second resistors in parallel connection and a first transistor connected to govern the connection of said second resistor to said first resistor, the output terminal of said third NOR gate being connected to said first transistor such that said first transistor is conductive when the output of said third NOR gate is at H level; a first NAND gate, said at least one electrical signal representing the degree of opening of the throttle valve including a first throttle signal which is at H level only when said opening degree is in said smallest range and being supplied to an input terminal of said first NAND gate; a vehicle speed signal circuit arranged to supply a H level signal to another input terminal of said NAND gate only when the vehicle speed is below a predetermined speed; means connecting said first monostable multivibrator to said first NAND gate as to be triggered and produce at a first output terminal thereof a H level pulse signal when the output of said first NAND gate shifts from H level to L level; and a switching circuit connected to maintain said one of electromagnetic valves in the excited state when said H level pulse signal is produced for a period of time equal to the width of said pulse.

3. A control apparatus as claimed in claim 1, wherein said heat-sensitive means of said temperature sensor includes a recess formed on one side of the clutch input member reverse to a side to be engaged with the clutch output member at a location opposite to said reed relay, a housing fixedly disposed in said recess, a flexible diaphragm arranged generally parallel to the latter side of the clutch input member to divide the interior of said housing into two regions, one of said two regions being more remote than the other from the bottom of said recess formed in a first portion adjacent said diaphragm to allow deflection of said diaphragm and formed in the remaining portion cylindrical to extend generally perpendicularly to said diaphragm and have an open end, a wax filled in the other region of said interior, said wax having such a coefficient of volumetric expansion by heat that said diaphragm is deflected towards said first portion when the clutch output member is in contact with the clutch input member and the temperature of the clutch output member exceeds said predetermined temperature, a liquid of a high viscosity filled in said first portion, a piston slidably received in said remaining portion such that said liquid is interposed between said diaphragm and the inner end of said piston, and means for biasing said piston towards said diaphragm, said permanent magnet being fixed to the outer end of said piston.

4. A control apparatus as claimed in claim 1, wherein said heat-sensitive means includes a recess formed on one side of the clutch input member reverse to a side to be engaged with the clutch output member at a location opposite to said reed relay, a paramagnetic material filled in said recess to cover the walls of said recess, and a block of a ferromagnetic material fixedly disposed in said recess to be enclosed by said paramagnetic material but to have an exposed surface facing said reed relay, the magnetic Curie point of said ferromagnetic material being substantially equal to said predetermined temperature, said permanent magnet being fixed to said exposed surface of said block.

5. A control apparatus as claimed in claim 1, wherein said temperature sensor further comprises an electromagnet arranged close to said reed relay such that said reed relay is kept closed when said electromagnet is in the excited state, and a second transistor governing the flow of an excitating current through said electromagnet, the output terminal of said second NOR gate of said control circuit being connected also to said second transistor such that said second transistor is conductive when the output of said second NOR gate is at H level.

* * * * *